United States Patent
Tanaka et al.

(10) Patent No.: US 7,031,146 B2
(45) Date of Patent: Apr. 18, 2006

(54) NOTEBOOK TYPE APPARATUS

(75) Inventors: Wataru Tanaka, Kawasaki (JP); Ikki Tatsukami, Kawasaki (JP); Takashi Iijima, Kawasaki (JP); Yutaka Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/733,093

(22) Filed: Dec. 11, 2003

(65) Prior Publication Data

US 2004/0120110 A1 Jun. 24, 2004

Related U.S. Application Data

(62) Division of application No. 10/085,946, filed on Feb. 28, 2002, now Pat. No. 6,693,795.

(30) Foreign Application Priority Data

Oct. 18, 2001 (JP) .............................. 2001-321066

(51) Int. Cl.
*H05K 5/00* (2006.01)

(52) U.S. Cl. .................... 361/683; 361/727; 312/223.3; 345/169

(58) Field of Classification Search ........ 361/680–682, 361/683.686, 726, 727; 312/223.2–223.3; 345/168, 169; 292/137, 302; 439/165; 206/586
See application file for complete search history.

(56) References Cited

U.S. PATENT DOCUMENTS

| | | | |
|---|---|---|---|
| 4,986,763 A | 1/1991 | Boyle | 439/165 |
| 5,583,742 A | 12/1996 | Noda et al. | 361/683 |
| 5,623,390 A | 4/1997 | Noda et al. | 361/679 |
| 6,028,765 A | 2/2000 | Swindler et al. | 361/683 |
| 6,034,751 A | 3/2000 | Kamiya | 349/60 |
| 6,036,287 A | 3/2000 | Kim | 312/223.2 |
| 6,104,605 A * | 8/2000 | Lee | 361/681 |
| 6,122,167 A | 9/2000 | Smith et al. | 361/687 |
| 6,128,192 A | 10/2000 | Howell et al. | 361/724 |
| 6,181,550 B1 | 1/2001 | Kim | 361/683 |
| 6,206,195 B1 | 3/2001 | Cheng | 206/586 |
| 6,344,967 B1 | 2/2002 | Zamora et al. | 361/680 |
| 6,525,927 B1 | 2/2003 | Sugai et al. | 361/683 |
| 6,693,795 B1 * | 2/2004 | Tanaka et al. | 361/683 |

FOREIGN PATENT DOCUMENTS

| | | |
|---|---|---|
| CN | 1045654 A | 9/1990 |
| CN | 1304505 A | 7/2001 |

(Continued)

*Primary Examiner*—Hung Van Duong
(74) *Attorney, Agent, or Firm*—Greer, Burns & Crain, Ltd

(57) ABSTRACT

An electronic apparatus including a body having a circuit board; and a display device connected through a connecting portion to the body in an open position or in a closed position with respect to said body. Preferably, the body has two side surfaces which are not parallel to a central axis of the connecting portion. The two side surfaces have a first portion having a first distance between the two side surfaces of the body at the connecting portion of the body and the display device, with the first distance being smaller than a width of the display device; and a second portion having a second distance between the two side surfaces, with the second distance being larger than the first distance, and being approximately equal to the width of the display device. Also, the second portion is preferably a part of the body at a farther position from the connecting portion than the first portion.

3 Claims, 15 Drawing Sheets

FOREIGN PATENT DOCUMENTS

| | | |
|---|---|---|
| EP | 0545867 | 6/1993 |
| JP | 5-64945 | 8/1993 |
| JP | 07110726 | 4/1995 |
| JP | 7-168647 | 7/1995 |
| JP | 9-288455 | 11/1997 |
| JP | 11-353054 | 12/1999 |
| JP | 11353054 | 12/1999 |
| JP | 2000112564 | 4/2000 |
| JP | 2000-148295 | 5/2000 |
| JP | 2000148295 | 5/2000 |

* cited by examiner

NOTEBOOK TYPE APPARATUS

Divisional application, under 37 CFR 1.53(b), of prior application Ser. No. 10/085,946 filed on Feb. 28, 2002 now U.S. Pat. No. 6,693,795.

BACKGROUND OF THE INVENTION

1. Field of the Invention

The present invention relates to a notebook type information processing apparatus such as a notebook type personal computer.

2. Description of the Related Art

A notebook type personal computer comprises an apparatus body, including a circuit board, and a display device connected to the apparatus body by hinges, and the display device can be folded onto the apparatus body. Also, the apparatus body is provided with a keyboard and other input means.

FIG. 7 shows an example of a conventional notebook type personal computer. In FIG. 7, the conventional notebook type personal computer 1 comprises an apparatus body 2, and a display device 3 connected to the apparatus body 2 with hinges 4. The width "a" of the apparatus body 2 of the notebook type personal computer 1 between opposite sides thereof is equal to the width "b" of the display device 3 between opposite sides thereof, so that the sides of the apparatus body 2 and the sides of the display device 3 are continuous, in a plane, when the display device 3 is folded onto the apparatus body 2.

FIG. 8 shows a variation of the notebook type personal computer shown in FIG. 7. In FIG. 8, the width "a" of the apparatus body 2 of the notebook type personal computer 1 between opposite sides thereof is less than the width "b" of the display device 3 between opposite sides thereof, so that the sides of the display device 3 laterally extend beyond the sides of the apparatus body 2 when the display device 3 is folded onto the apparatus body 2.

The contour of the notebook type personal computer 1 shown in FIG. 7 is typical. But, there is a case that a contour different from the typical one, like the contour shown in FIG. 8, is required. For example, in a case of a large notebook type personal computer 1, if the shape of the lower portion (apparatus body 2) is the same as the shape of the upper portion (display device 3) when the display device 3 is folded onto the apparatus body 2, the computer only looks large but the appearance thereof is not attractive. It is therefore preferable that the size of the lower portion (apparatus body 2) is less than the size of the upper portion (display device 3), because it bears much of the appearance of the computer and increases the flexibility in the design of the computer. Furthermore, in a series of differently sized notebook type personal computers 1, it possible to design such that the sizes of the display devices are different from each other, but the sizes of the apparatus bodies are common to each other. In this case, one of the notebook type personal computers 1 in one series may have the width "a" between opposite sides of the computer body 2 less than width "b" between opposite sides of the display device 3.

FIG. 6 is a rear view of the notebook type personal computer 1, shown in FIG. 8, in the case where it is placed on its side. Numeral 4 denotes hinges, and numeral 5 denotes a latch for locking the display device 3 to the apparatus body 2 when the display 3 is folded in the closed position. The two hinges 4 are disposed at the rear of the notebook type personal computer 1, and the latch 5 is disposed at the front of the notebook type personal computer 1.

In the shock test of the notebook type personal computer 1, the notebook type personal computer 1 is dropped onto a wall surface 6, or is contacted to a wall surface 6 with a shock. In this case, the weight of the notebook type personal computer 1 is received only by the display device 3, and the weight of the apparatus body 2 is supported by the display device 3 through the hinges 4. When the apparatus body 2 twists around the hinges 4, and the front portion of the apparatus body 2 is displaced from the display device 3 and an undesirable force may be applied to the latch 5 disposed at the front of the apparatus body 2, thus damaging the latch 5.

SUMMARY OF THE INVENTION

It is an object of the present invention to provide a notebook type information processing apparatus in which the load on the apparatus body is received by the body itself along with the display device, and the shape of the apparatus body may be changed irrespective of the display device to increase the flexibility in the design of the apparatus.

The notebook type information processing apparatus, according to the present invention, comprises an apparatus body having a circuit board, a display device connected to said apparatus body with a hinge device, and said apparatus body having, in its side, a first side portion having a height and a second side portion having a height different from the height of the first side portion.

In this configuration, for example, the first side portion may be matched to the display device in size, and the load of the notebook type information processing apparatus may be supported by the apparatus body and the display device, while the shape of the second side portion may be designed irrespective of the size of the display device, and thereby the flexibility in the design of the apparatus may be increased.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The preferred embodiments of the present invention are described below with reference to the accompanying drawings.

Figure 1:
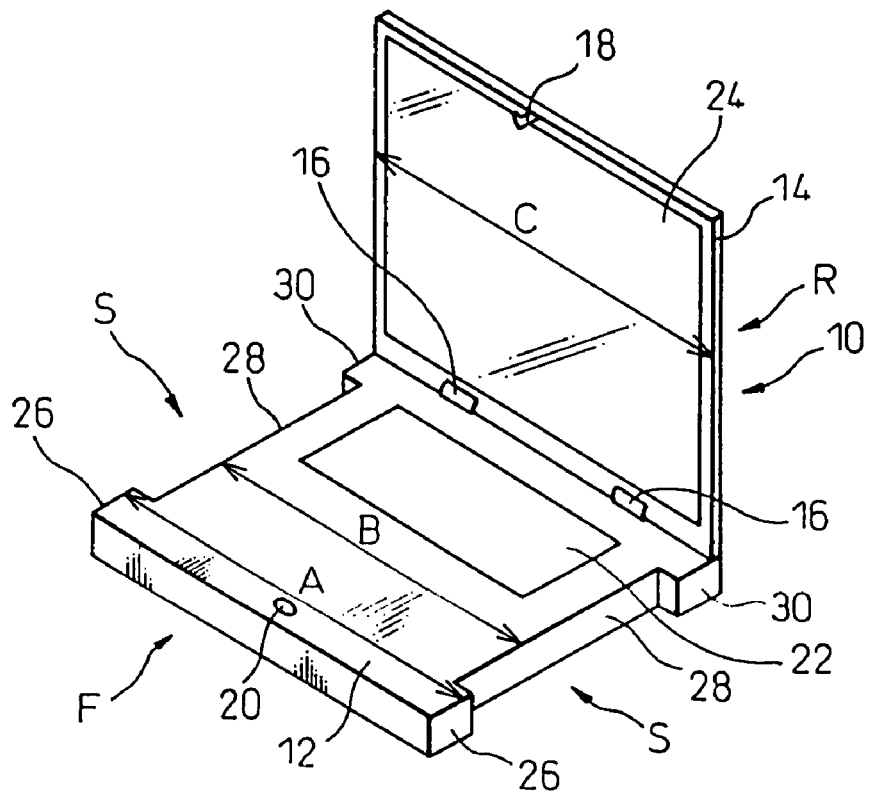
FIG. 1 is a perspective view of a notebook type personal computer according to a preferred embodiment of the present invention, showing the display device in the open position with respect to the apparatus body.
Figure 2:
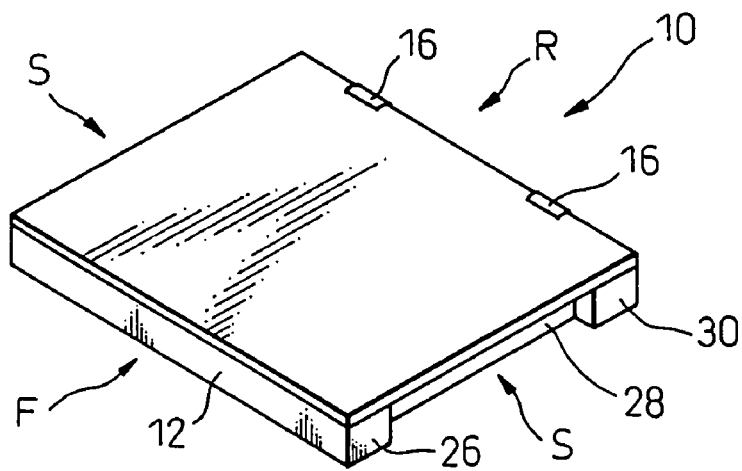
FIG. 2 is a perspective view of the notebook type personal computer shown in FIG. 1, showing the display device in the closed position with respect to the apparatus body.

FIG. 1 is a perspective view of a notebook type personal computer according to a preferred embodiment of the present invention, with a display device in the open position with respect to an apparatus body, and FIG. 2 is a perspective view of the notebook type personal computer shown in FIG. 1, with the display device in the closed position with respect to the apparatus body. The notebook type personal computer 10 shown in the FIGS. 1 and 2 is an example of a notebook type information processing apparatus. In these figures, letter F denotes the front of the notebook type personal computer 10, letter S denotes the side, and R denotes the rear.

The notebook type personal computer 10 comprises an apparatus body 12 and a display device 14 connected to the apparatus body 12 by hinges 16. A latch 18 is provided on the upper portion of the display device 14 (the front portion of the display device 14 when folded), and a latch hole 20 is provided in the front portion of the apparatus body 12. When the display device 14 is folded in the closed position, the latch 18 engages with the latch hole 20. The apparatus body 12 has a keyboard 22 and other input means. Inside the apparatus body 12, a circuit board (see FIG. 15) on which electric and electronic components are mounted is provided. The display device 14 comprises a liquid crystal display device, and has a displaying portion 24.

The apparatus body 12 has, at its side, a first side portion 26 and a second side portion 28 having a height different from the height of the first side portions 26. The height is measured in the direction from the center toward one side S. Furthermore, in this embodiment, the apparatus body 12 has an additional side portion 30.

The first side portion 26 is disposed at the front end or at a position near the front end of the apparatus body 12, and the second side portion 28 is disposed on the rear side of the first side portion 26. The first side portion 26 protrudes outward, like a lobe, with respect to the second side portion 28. In other words, the height of the first side portion 26 is greater than the height of the second side portion 28.

The additional side portion 30 is disposed at the rear end or at a position near the rear end of the apparatus body 12, and has the same height as that of the first side portion 26. The first side portion 26 and the additional side portion 30 are disposed in relatively narrow regions, as viewed in the direction from the front F to the rear R of the apparatus body 12, and the second side portion 28 is disposed in the relatively longer region between the first side portion 26 and the additional side portion 30.

The width of the apparatus body 12 between the opposite sides thereof at the first side portion 26 or the additional side portion 30 is denoted by A. The width of the apparatus body 12 between opposite sides thereof at the second side portion 28 is denoted by B. The width of the display device 14 between the opposite side thereof is denoted by C. The relationship among widths A, B, and C is described by the equation $A \approx C > B$. In other words, the width A is nearly equal to the width C, or the width A is slightly less than the width C within an error. Width B is less than the width C.

Figure 3:
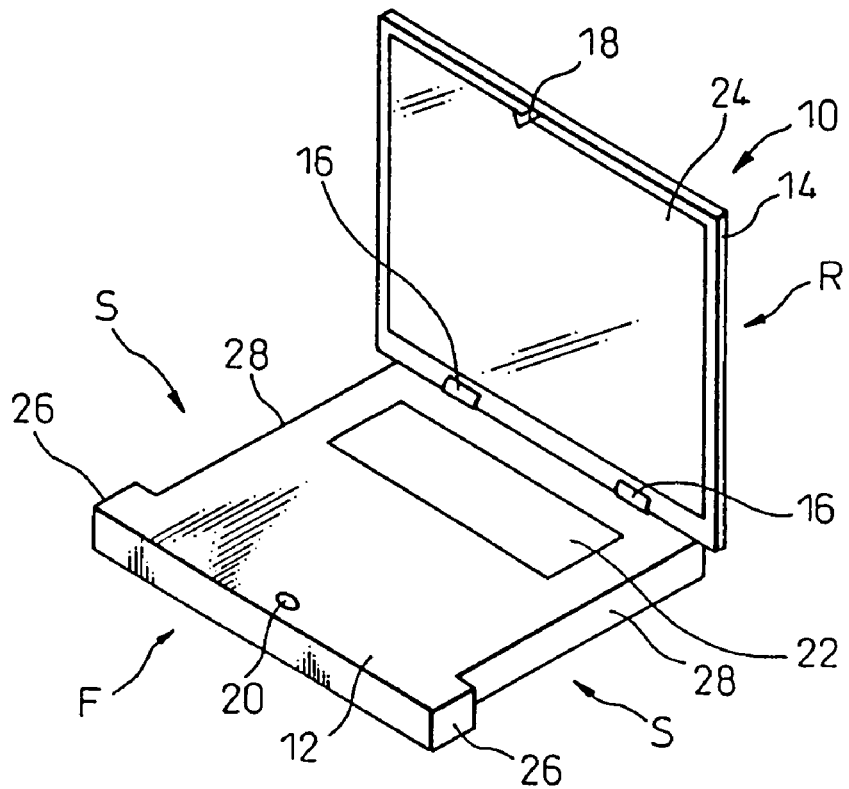
FIG. 3 is a perspective view of a variation of the notebook type personal computer shown in FIG. 1, showing the display device in the open position with respect to the apparatus body.
Figure 4:
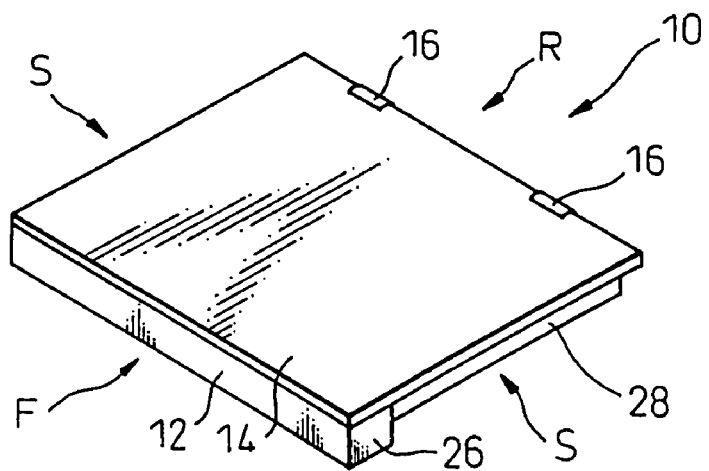
FIG. 4 is a perspective view of the notebook type personal computer shown in FIG. 3, showing the display device in the closed position with respect to the apparatus body.

FIGS. 3 and 4 are perspective views of a variation of the notebook type personal computer shown in FIGS. 1 and 2. The notebook type personal computer 10 shown in FIGS. 3 and 4 is different from the notebook type personal computer 10 shown in FIGS. 1 and 2 only in that the additional side portion 30 is deleted as shown in FIGS. 3 and 4, and is the same as the notebook type personal computer 10 shown in FIGS. 1 and 2 in other points.

Figure 5:
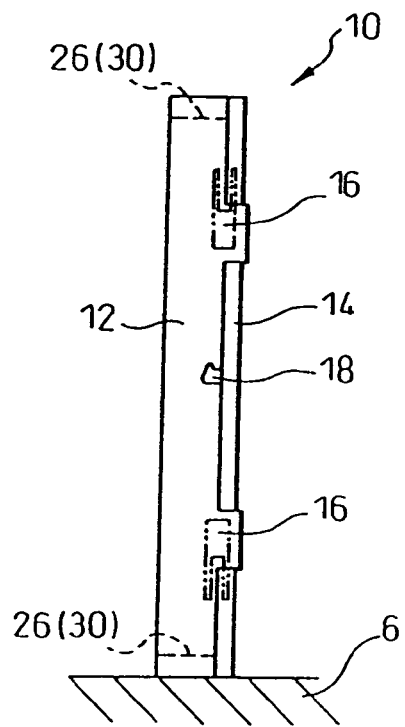
FIG. 5 is a rear view of the notebook type personal computer shown in FIG. 2, when it is placed on its side.
Figure 6:
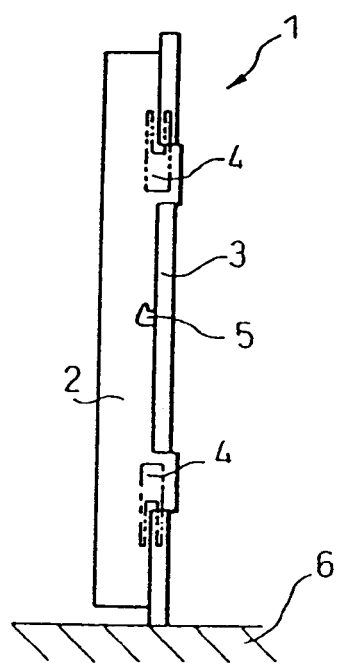
FIG. 6 is a rear view of a notebook type personal computer shown in FIG. 8, when it is placed on its side.
Figure 7:
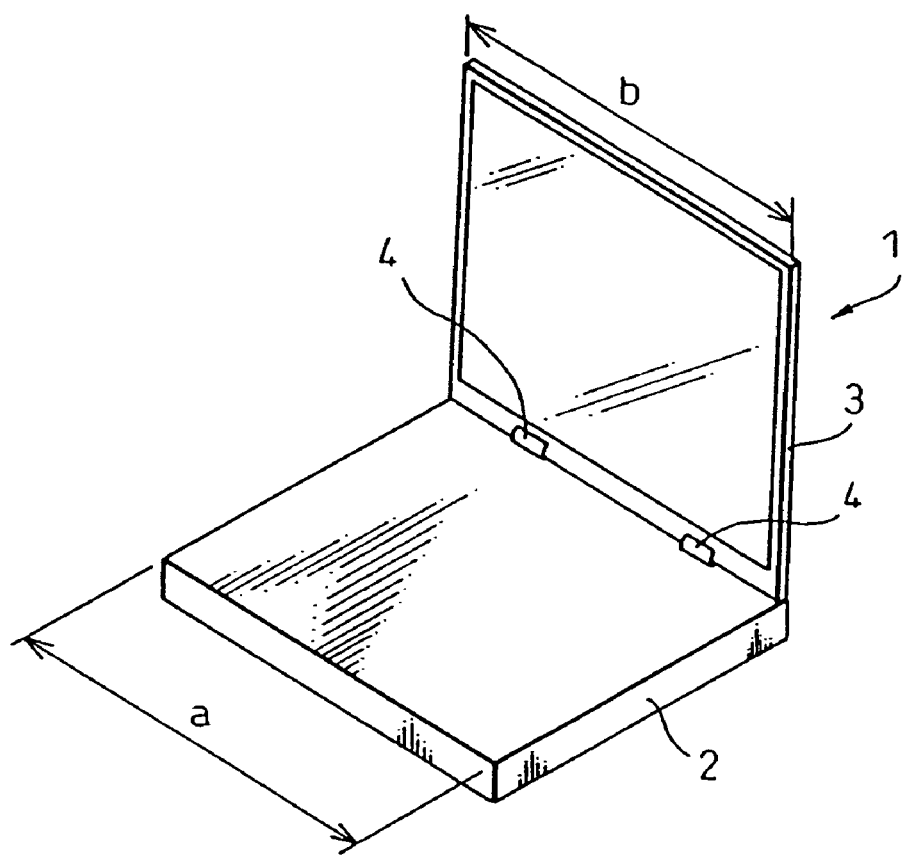
FIG. 7 is a perspective view of an example of a conventional notebook type personal computer.
Figure 8:
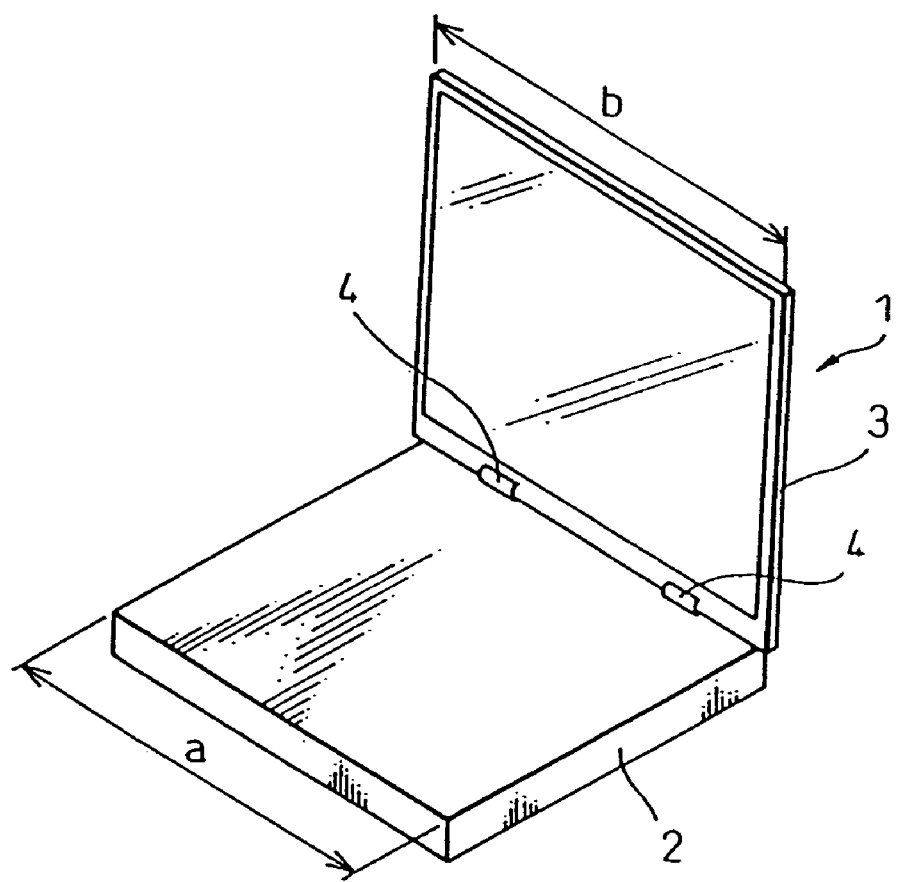
FIG. 8 is a perspective view of a variation of the notebook type personal computer shown in FIG. 7.

FIG. 5 is a rear view of the notebook type personal computer 10 shown in FIG. 2, with its one side pointing downward.

When the notebook type personal computer 10 is dropped onto a wall surface 6, or is contacted to the wall surface 6 with a shock, the weight of the notebook type personal computer 10 is supported by the first side portion 26 and the additional side portion 30 of the apparatus body 12 and the display device 14. The weight of the apparatus body 12 is supported by the body itself, and the apparatus body 12 does not twist around the hinges 16. Thus, the latch 18 positioned at the front of the apparatus body 12 is not damaged. This effect is similar to that of the arrangement having no additional side portion 30 as shown in FIGS. 3 and 4.

In this way, the first side portion 26 (and the additional side portion 30) can receive the load along with the display device 14 when the load is applied. The second side portion 28 does not receive the load applied to the apparatus body 12. As a result, the shape of the second side portion 28 may be designed freely irrespective of the size of the display device 14, and thereby the flexibility in the design of the computer may be increased.

Figure 9:
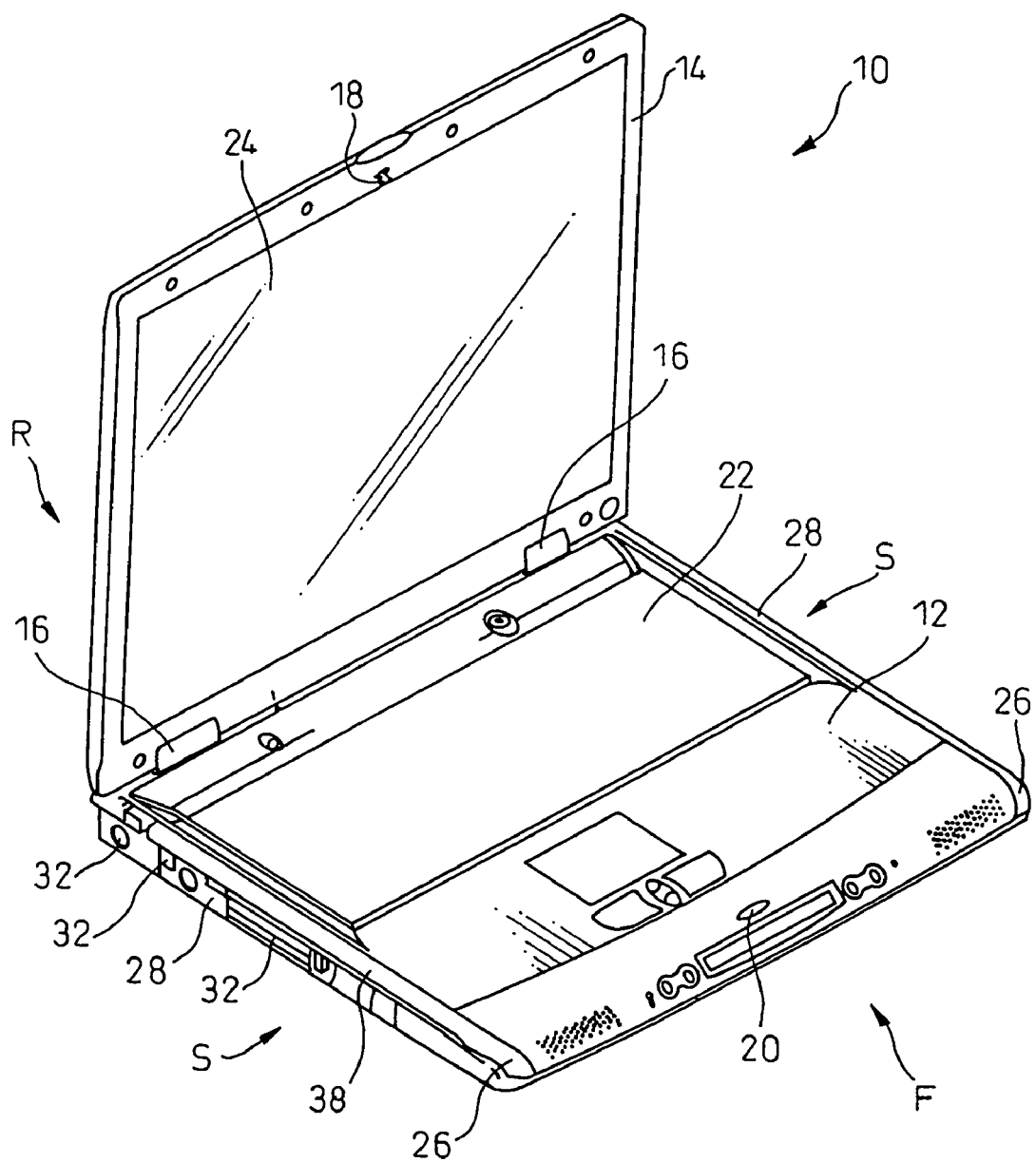
FIG. 9 is a left perspective view of a notebook type personal computer according to another embodiment of the present invention.
Figure 10:
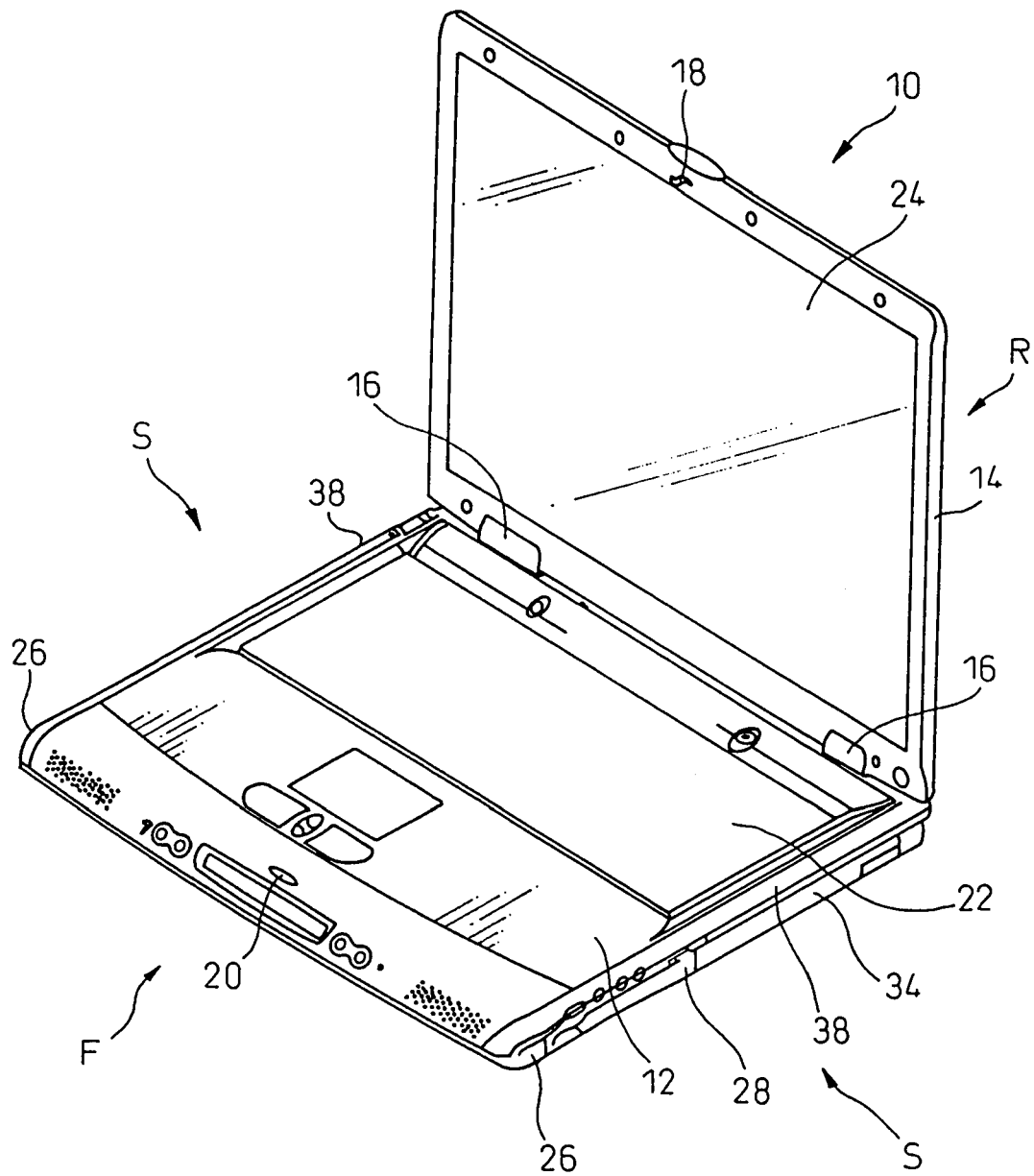
FIG. 10 is a right perspective view of the notebook type personal computer shown in FIG. 9.

FIG. 9 is a left perspective view of another embodiment of the notebook type personal computer according to the present invention, and FIG. 10 is a right perspective view of the notebook type personal computer shown in FIG. 9. The notebook type personal computer 10 comprises an apparatus body 12 and a display device 14 connected to the apparatus body 12 by hinges 16. A latch 18 is provided on the upper portion of the display device 14 and a latch hole 20 is provided in the front portion of the apparatus body 12. In these figures, letter F denotes the front of the notebook type personal computer 10, letter S denotes the side, and R denotes the rear.

The apparatus body 12 has a keyboard 22 and other input means. Inside the apparatus body 12, a circuit board (see FIG. 15) on which electric and electronic components are mounted is provided. The display device 14 comprises a liquid crystal display device, and has a displaying portion 24. Interface portions 32 are disposed on one side of the apparatus body 12, and a CD slot 34 is disposed on the other side of the apparatus body 12.

Figure 11:
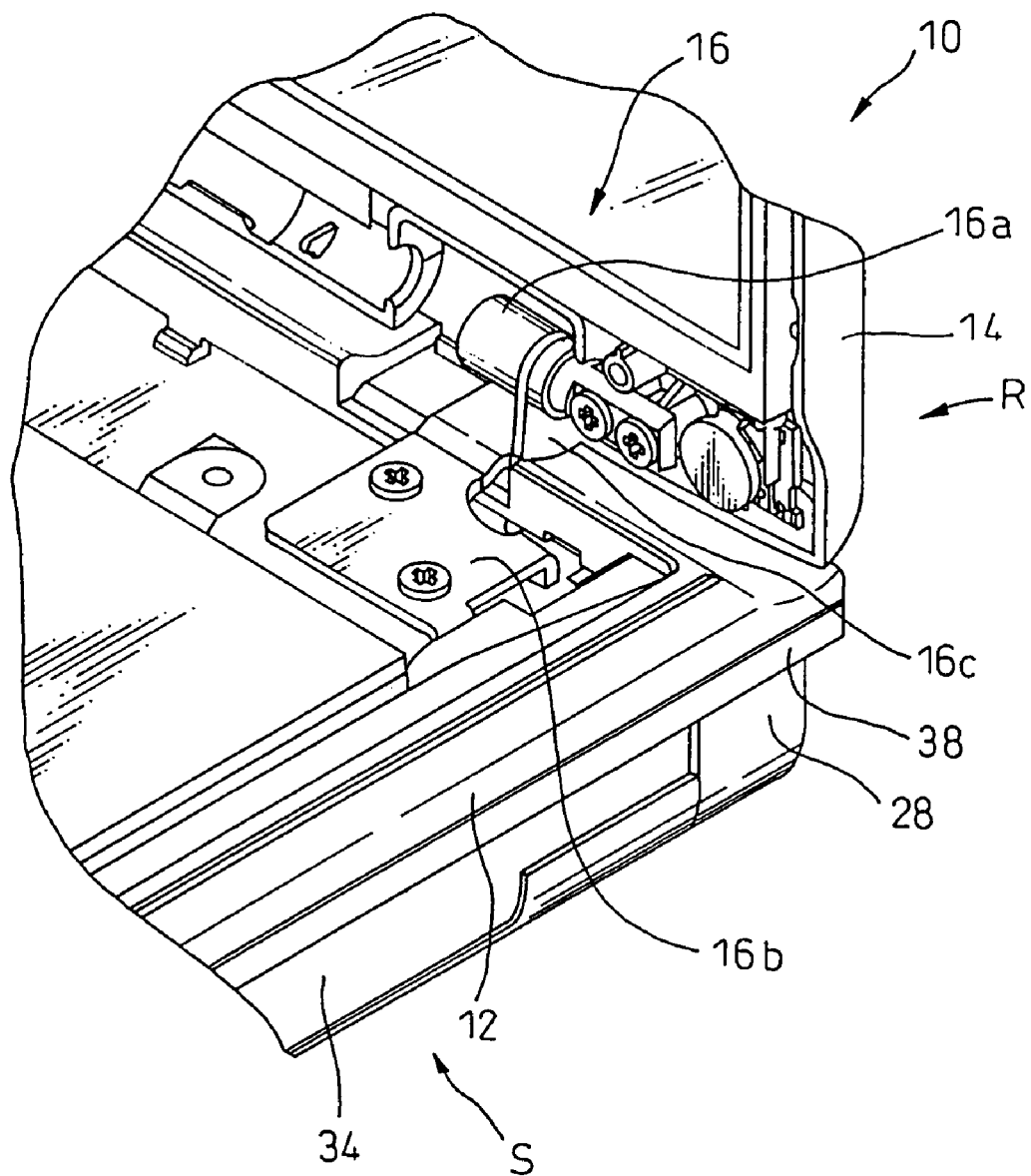
FIG. 11 is a partially cut away, perspective view of a part of the notebook type personal computer shown in FIGS. 9 and 10.

FIG. 11 is a partially cut away, perspective view of a part of the notebook type personal computer 10 shown in FIGS. 9 and 10. In FIG. 11, parts of the outer casings of the apparatus body 12 and the display device 14 are cut away to show the part of the hinge device 16. The hinge device 16 includes a torque shaft 16a attached to the display device 14 and a plate 16b attached to the apparatus body 12. A vertical member 16c of the plate 16b is pinched and supported by the components of the torque shaft 16a. The hinge device 16 is of a well known one.

Figure 12:
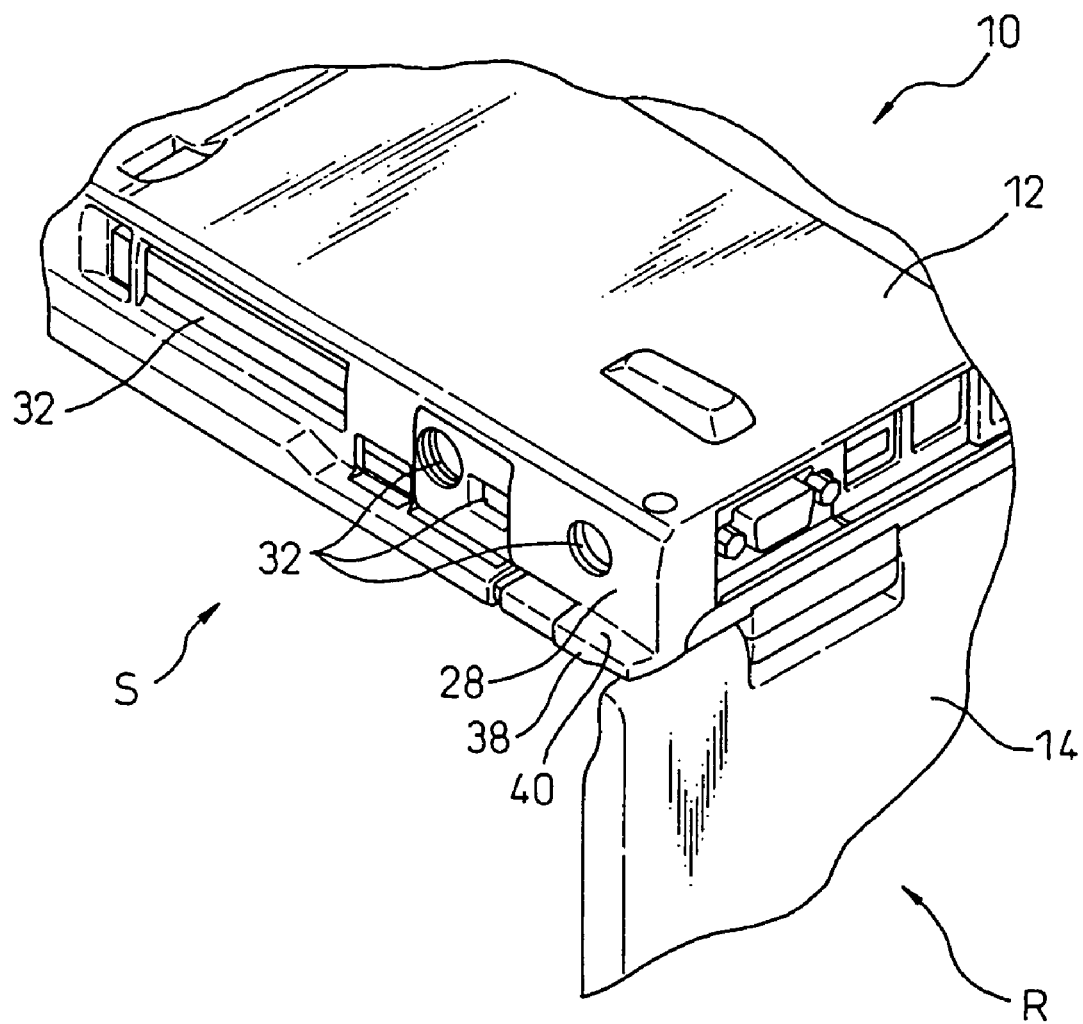
FIG. 12 is a bottom perspective view of a part of the notebook type personal computer shown in FIGS. 9 and 10.
Figure 13:
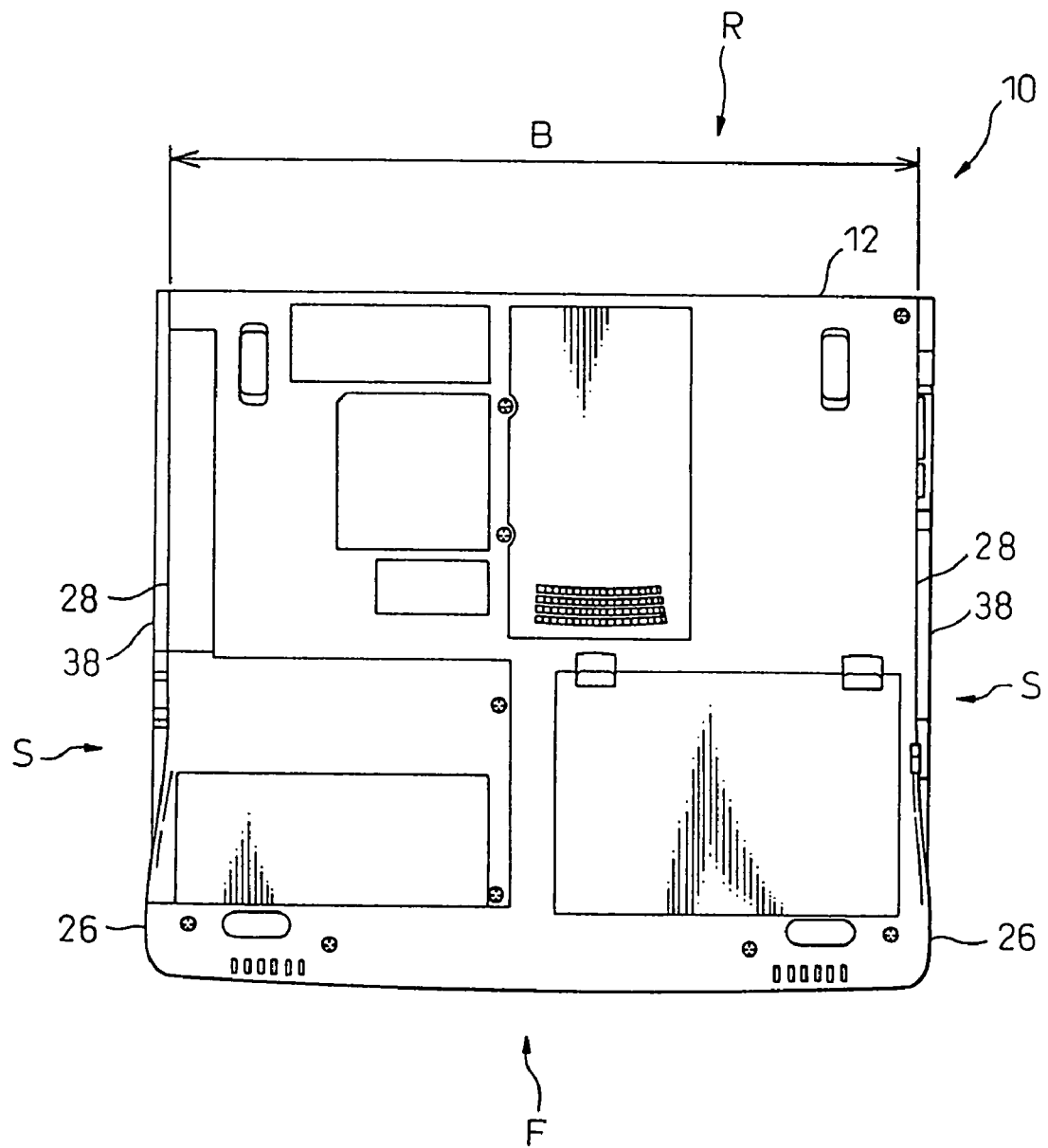
FIG. 13 is a bottom view of the notebook type personal computer shown in FIGS. 9 and 10.
Figure 14:
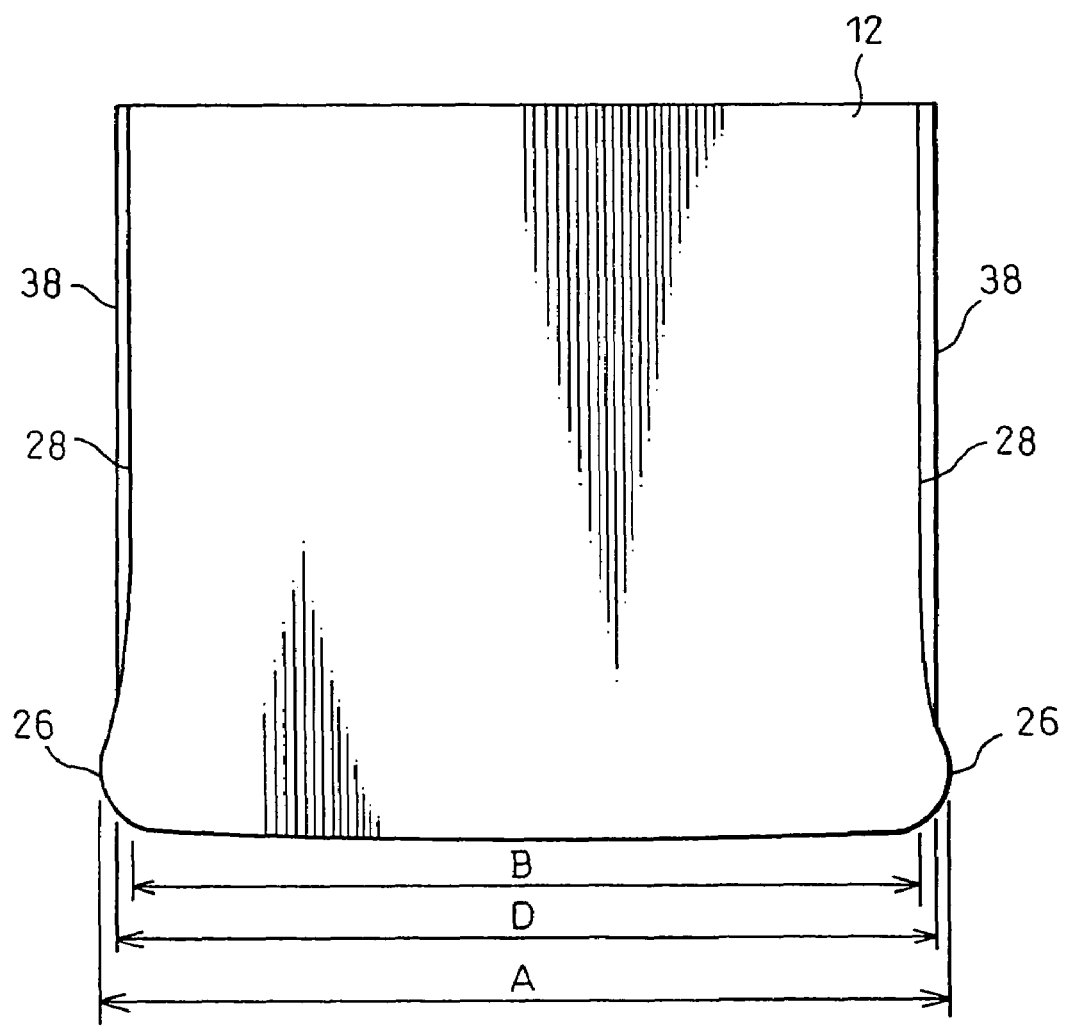
FIG. 14 is a schematic bottom view of the notebook type personal computer shown in FIG. 13.

FIG. 12 is a bottom perspective view of a part of the notebook type personal computer 10 shown in FIGS. 9 and 10. FIG. 13 is a bottom view of the apparatus body 12 of the notebook type personal computer 10 shown in FIGS. 9 and 10. FIG. 14 is a schematic bottom view of the notebook type personal computer 10 (apparatus body 12) shown in FIG. 13.

In FIGS. 9 to 14, the apparatus body 12 comprises a first side portion 26, a second side portion 28 having a height different from that of the first side portion 26, and a third side portion 38. The first side portion 26 is formed as a protrusion like a lobe.

The relationship among these side portions 26, 28, and 38 is shown in a simplified manner in FIG. 14. In FIG. 14, the width of the apparatus body 12 between opposite sides thereof at the first side portion 26 is denoted by A, and the width of the apparatus body 12 between the opposite sides thereof at the second side portion 28 is denoted by B. The width of the display device 14 is denoted by C. Like the embodiment shown in FIG. 1 to FIG. 5, the relationship among widths A, B, and C is described by the equation $A \approx C > B$. In other words, the width A is nearly equal to the width C, or the width A is slightly less than the width C within an error. Width B is less than the width C. Thus, as described above, the first and second side portions 26 and 28 can support the load of the apparatus body 12 along with the display device 14, and the shape of the apparatus body 12 may be changed irrespective of the display device 14, and thereby the flexibility in the design of the computer may be increased.

In addition, the width of the apparatus body 12 between the opposite sides thereof at the third side portion 38 is denoted by D. The relationship among widths A, B, and D is described by the equation $A > D > B$. In other words, the first side portion 26 protrudes outward with respect to the second side portion 28, and the third side portion 38 protrudes outward with respect to the second side portion 28 and recedes inward with respect to the first side portion 26. The shape of the apparatus body 12 at the third side portion 38 and the shape of the apparatus body 12 at the second side portion 26 can be changed irrespective of the display device 14, and thereby the flexibility in the design of the computer may be further increased.

The first side portion 26 is disposed in the relatively narrow region at the front end or at a position near the front end of the apparatus body 12, and the second side portion 28 and the third side portion 38 are disposed in the relatively wide region on the rear side of the first side portion.

As shown in FIGS. 11 and 12, the second side portion 28 extends near the bottom of the apparatus body 12, and the third side portion 38 extends near the upper surface of the apparatus body 12. A shoulder 20 exists between the second side portion 28 and the third side portion 38. The second side portion 28 and the third side portion 38 extend substantially in parallel to the upper surface and the bottom surface of the apparatus body 12 and substantially in parallel to each other.

As shown in FIGS. 9 and 10, the front end portion of the apparatus body 12 slopes forward with a round contour. The first side portion 26 is smoothly continuous to the second side portion 28 and the third side portion 38.

The interface portions 32 are provided at the second side portion 28 in one side of the apparatus body 12, and the slot 34 for a CD is provided at the second side portion 28 in the other side of the apparatus body 12.

Figure 15:
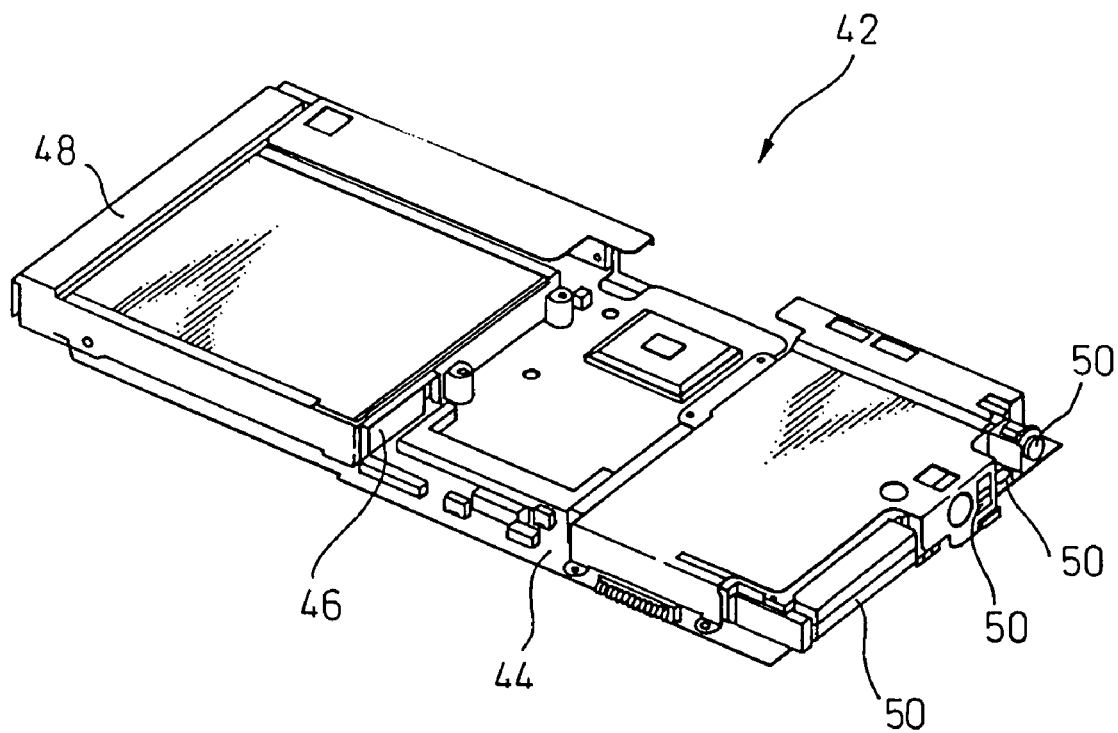
FIG. 15 is a perspective view of the circuit board unit disposed in the apparatus body of the notebook type personal computer shown in FIGS. 9 and 10.

FIG. 15 is perspective view of the circuit board unit 42 disposed in the apparatus body 12 of the notebook type personal computer 10 shown in FIGS. 9 and 10. The circuit board unit 42 includes a mother board or main board 44 and electric and electronic components mounted thereon. The main board 44 has a connector 46, and a CD drive unit 48 is mounted on the main board 44 and connected to the connector 46. When the circuit board unit 44 is arranged in the apparatus body 12, the CD drive unit 48 is located adjacent to the CD slot 34.

In addition, the main board 44 has interface connectors 50. When the circuit board unit 42 is arranged in the apparatus body 12, the interface connectors 50 are located adjacent to the interface portions 32. In this way, the CD slot 34 and the interface portions 32 are arranged in the second side portions 28 of the apparatus body 12, and the second side portions 28 of the apparatus body 12 are adapted to the circuit board unit 42 including the main board 44.

It is preferable and convenient that the notebook type personal computer 10 shown in FIGS. 9 to 14 is adopted as one of a series of differently sized notebook type personal computers. In this embodiment, the notebook type personal computer 10 is formed as a 15-inch personal computer.

Figure 16:
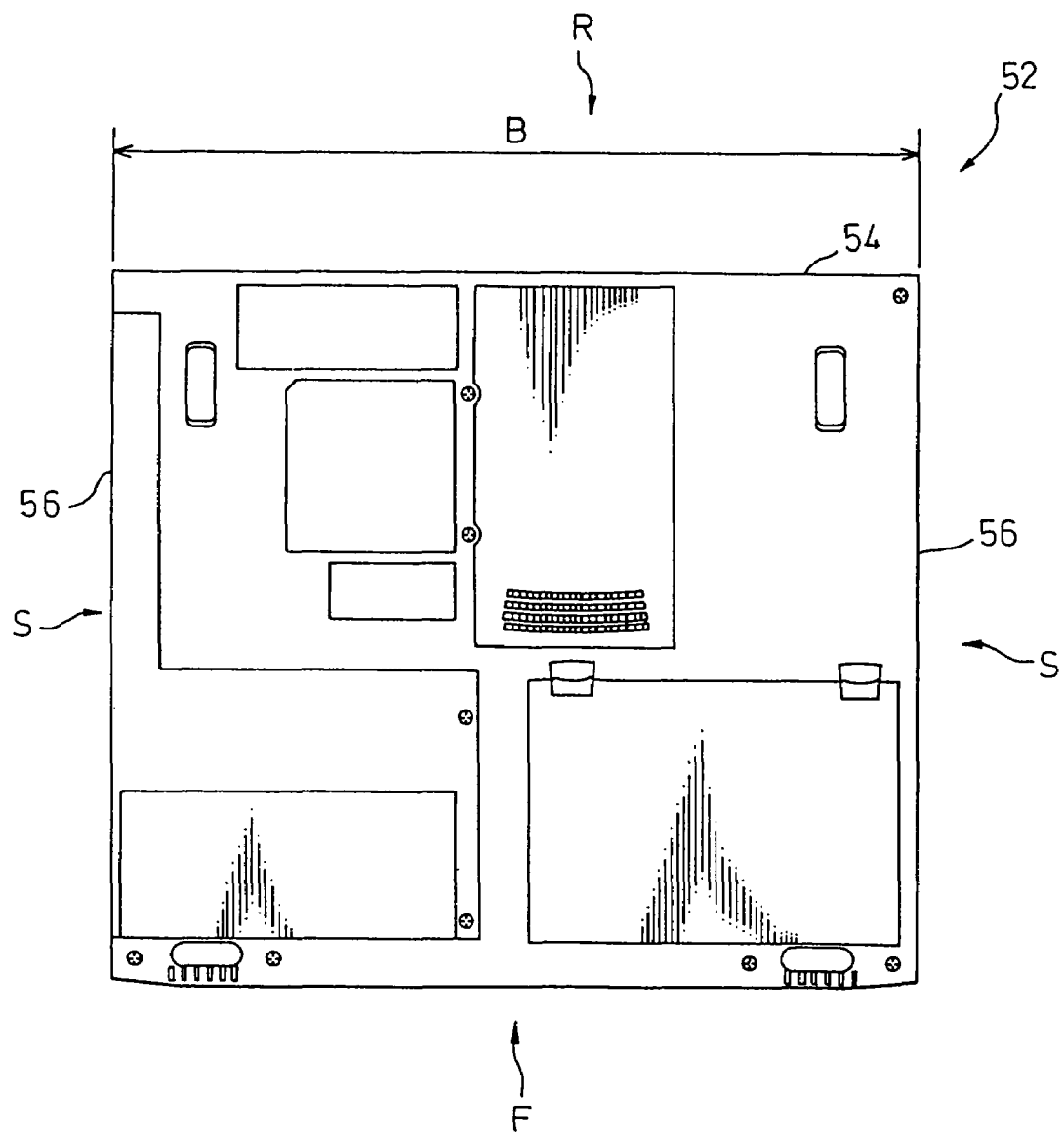
FIG. 16 is a bottom view of an apparatus body of a comparative notebook type personal computer.

FIG. 16 is a bottom view of an apparatus body 54 of a comparative notebook type personal computer 52. The notebook type personal computer 52 shown in FIG. 16 is formed as a 14-inch personal computer. The notebook type personal computer 10 is one of a plurality of notebook type personal computers in one series which includes the notebook type personal computer 52. Display devices having different sizes are used for a plurality of notebook type personal computers in this series, but the circuit board unit 42 shown in FIG. 15 is commonly used for all of the apparatus bodies.

The apparatus body 54 of the notebook type personal computer 52 shown in FIG. 16 has flat sides 56, and the width of the apparatus body 54 (distance between the opposite sides 56) is B. Width B of the apparatus body 54 shown in FIG. 16 is the same as width B of the apparatus body 12 between opposite sides thereof at the second side portion 28 shown in FIG. 13. Thus, the circuit board unit 42 shown in FIG. 15 may be commonly used for the apparatus body 12 shown in FIG. 13 and the apparatus body 54 shown in FIG. 16.

In the design of the notebook type personal computer 10 shown in FIG. 13, if a portion of the apparatus body 12 including the second side portion 28 shown in FIG. 13 is designed under the same design condition as the apparatus body 54 shown in FIG. 16, and then a portion including the first side portions 26 and the third side portions 38 is additionally designed, the notebook type personal computer 10 shown in FIGS. 9 to 14 can be easily designed.

FIGS. 17A to 20B are perspective views of modifications of the notebook type personal computer according to the present invention. In these examples, the first side portion 26, and the additional side portion 30 or the third side portion 38 are detachable/attachable components. Each of FIGS. 17A, 18A, 19A and 20A shows the state that a detachably attachable component is attached to the apparatus body 12, and each of FIGS. 17B, 18B, 19B and 20B shows the state that the detachably attachable component is detached from the apparatus body 12.

Figure 17A:
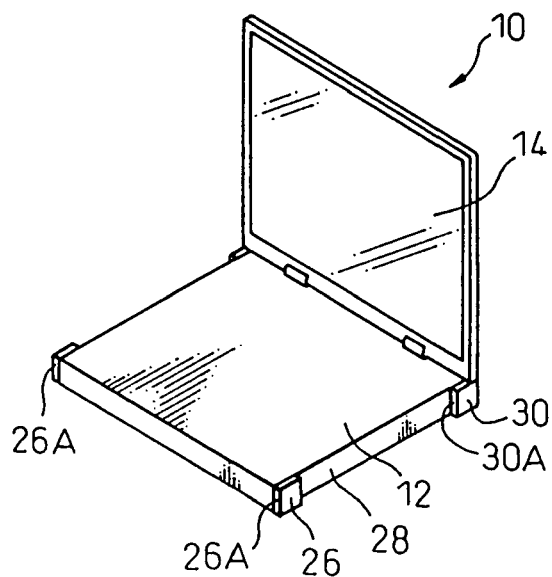
FIGS. 17A and 17B are perspective views of another example of the notebook type personal computer according to the present invention.
Figure 17B:
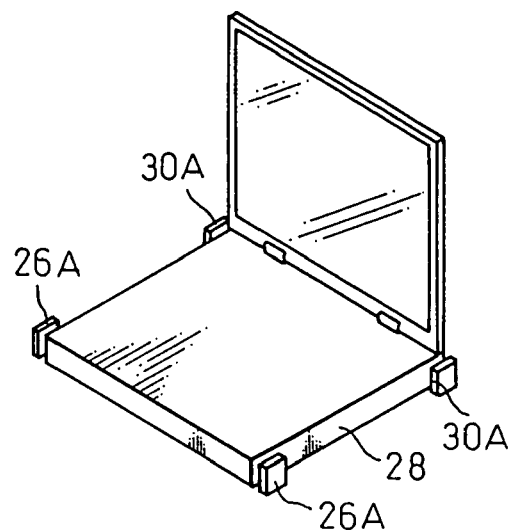

In FIGS. 17A and 17B, the sides of the apparatus body 12 is formed so that the surfaces of the sides are generally equal to the surfaces of the second side portions 28, and protruding portions including the first side portions 26 and the additional side portions 30 are made as detachably attachable components 26A and 30A. The apparatus body 12 from which the components 26A and 30A are removed can be used as a 14-inch notebook type personal computer, and the apparatus body 12 to which the components 26A and 30A are attached can be used as a 15-inch notebook type personal computer.

Figure 18A:
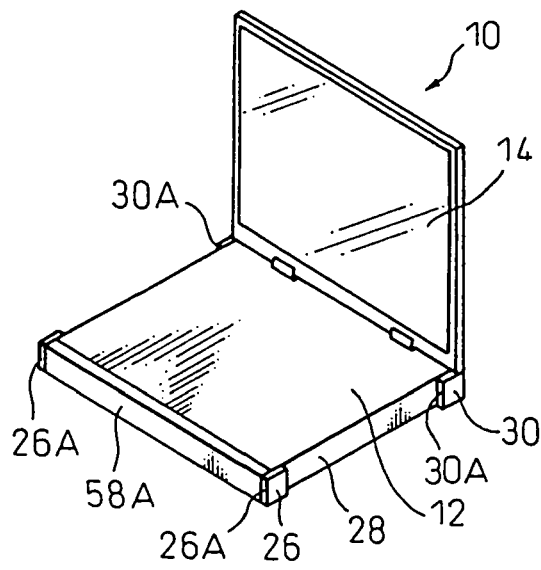
FIGS. 18A and 18B are perspective views of a further example of the notebook type personal computer according to the present invention.
Figure 18B:
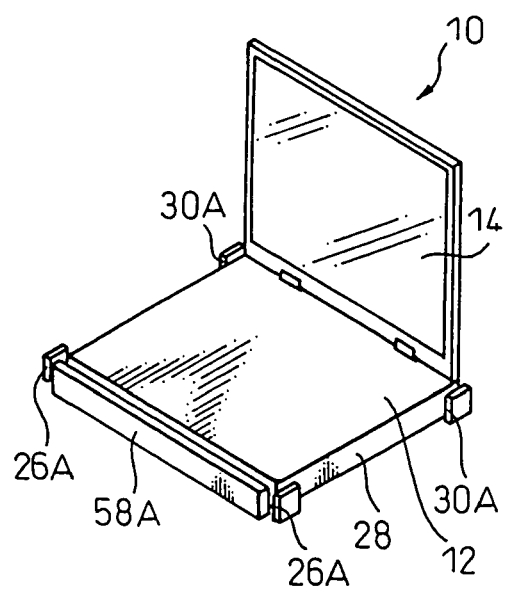

In FIGS. 18A and 18B, protruding portions including the first side portions 26 and the additional side portions 30 are made as detachably attachable components 26A and 30A respectively, and a front portion of the apparatus body 12 is made as a detachably attachable component 58A.

Figure 19A:
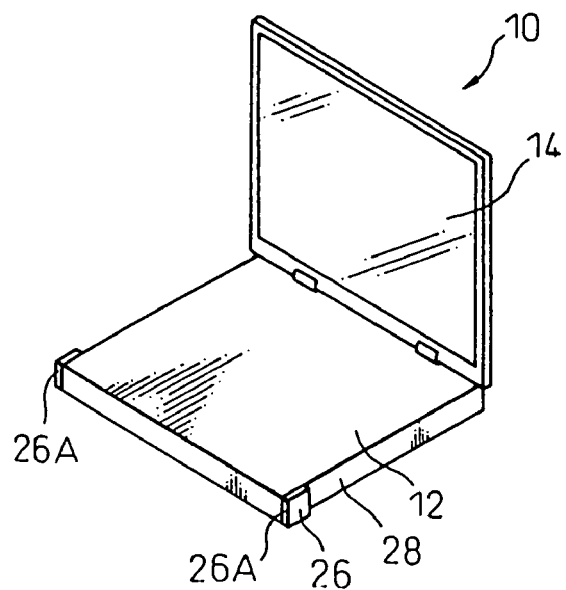
FIGS. 19A and 19B are perspective views of a further example of the notebook type personal computer according to the present invention.
Figure 19B:
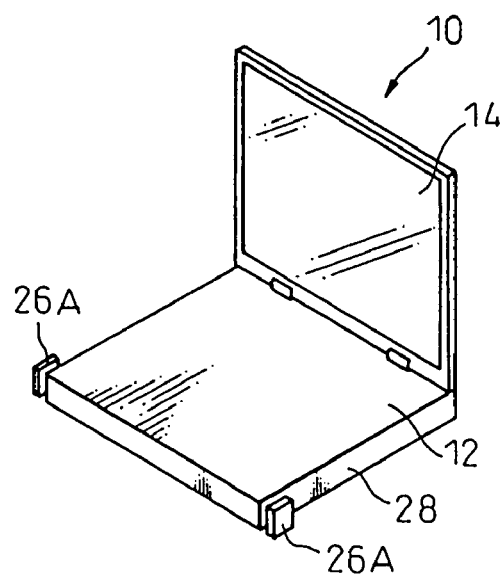

In FIGS. 19A and 19B, protruding portions including the first side portions 26 are made as a detachably attachable components 26A.

Figure 20A:
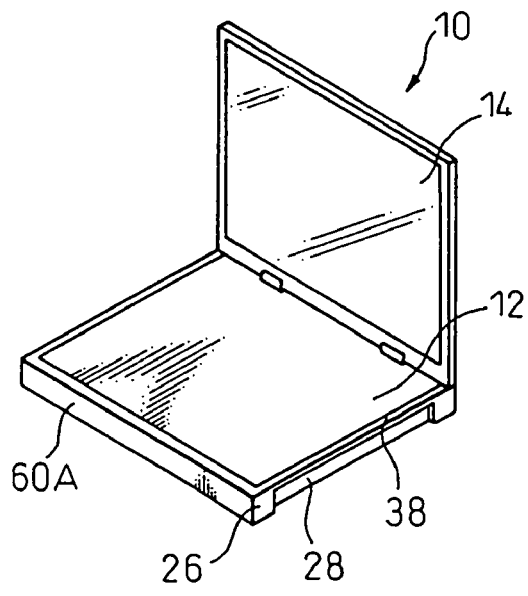
FIGS. 20A and 20B are perspective views of a still further example of the notebook type personal computer according to the present invention.
Figure 20B:
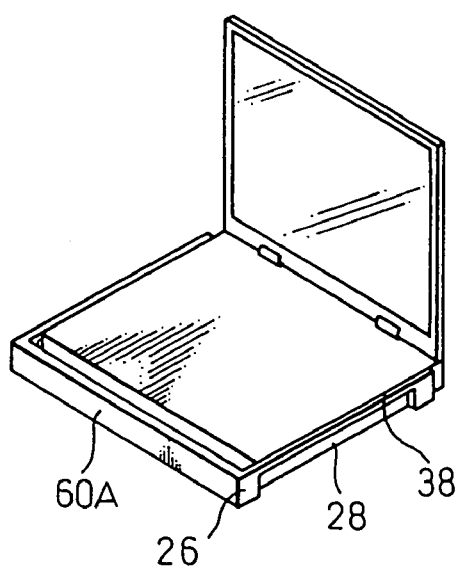

In FIGS. 20A and 20B, the front and side portions of the apparatus body 12 are made by one detachably attachable component 60A. The detachably attachable component 60A include the first side portions 26, the second side portions 28, and the third side portions 38.

As described above in greater detail, the present invention provides a notebook type information processing apparatus, wherein the load of the apparatus body is supported by the body itself and the display device, and the shape of the apparatus body may be changed irrespective of the display device to increase the flexibility in the design of the apparatus.

What is claimed is:

1. An electronic apparatus comprising:
  a body having a circuit board; and
  a display device connected through a connecting portion to said body in an open position or in a closed position with respect to said body; wherein
  said body has two side surfaces which are not parallel to a central axis of said connecting portion;
  said two side surfaces having:
    a first portion having a first distance between said two side surfaces of said body at the connecting portion of said body and said display device, said first distance being smaller than a width of said display device; and
    a second portion having a second distance between said two side surfaces, said second distance being larger than said first distance, and being approximately equal to the width of said display device;
    said second portion being a part of said body at a farther position from said connecting portion than said first portion.

2. The notebook type information processing apparatus according to claim 1, wherein a portion of said apparatus body including at least said second portion is made as a detachably attachable component.

3. The electronic apparatus as claimed in claim 1, wherein said second portion is provided at a position near the farthermost position from said connecting portion.

* * * * *